Figure 1:
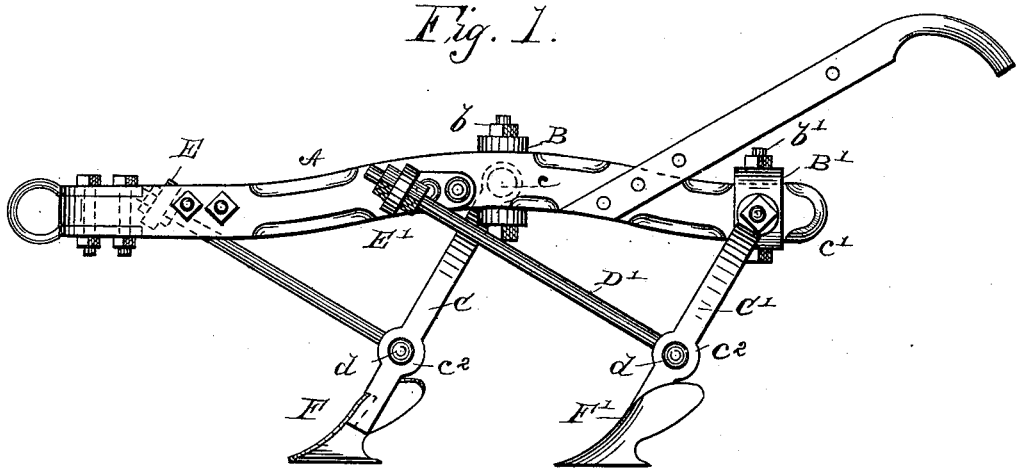

(No Model.)

L. FOSTER.
CULTIVATOR.

No. 353,742. Patented Dec. 7, 1886.

Witnesses
John C. Miller
Percy White

Inventor
Lawson Foster.
By his Attorney
E. H. Gelston.

UNITED STATES PATENT OFFICE.

LAWSON FOSTER, OF DUNCAN, SOUTH CAROLINA.

CULTIVATOR.

SPECIFICATION forming part of Letters Patent No. 353,742, dated December 7, 1886.

Application filed September 3, 1886. Serial No. 212,638. (No model.)

*To all whom it may concern:*

Be it known that I, LAWSON FOSTER, a citizen of the United States, residing at Duncan, in the county of Spartanburg and State of South Carolina, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this improvement is a cultivator having stocks that may be adjusted backward or forward at a greater or less angle to the draft-beam for the purpose of causing the shovels or shares to cut and run at different depths, as occasion may require, for adapting the implement exactly to the cultivation of different kinds of plants at different stages of growth in different kinds of soil, and that may be adjusted laterally at an outward angle to the beam for the purpose of adapting the implement to moving the soil from the middle of the plant-rows toward the plants at each side thereof or inwardly, for adapting the implement for use as a straddle-row cultivator and to moving the soil from the middle of the rows toward the plants over which the implement passes. These results are attainable by the mechanism illustrated in the drawings herewith filed as part hereof, in which the same letters of reference denote the same parts in the different views.

Figure 3:
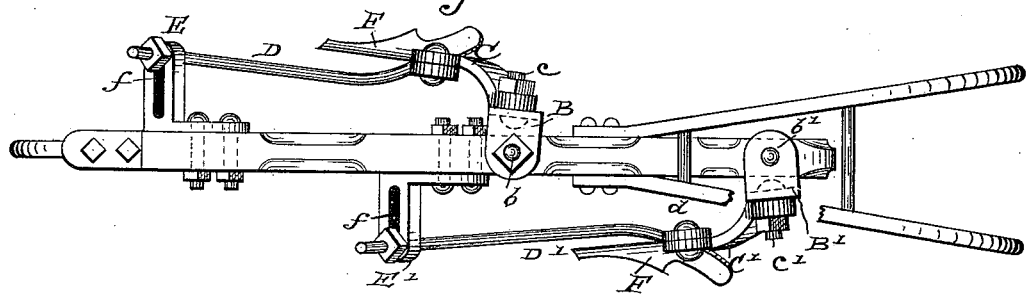
Figure 2:
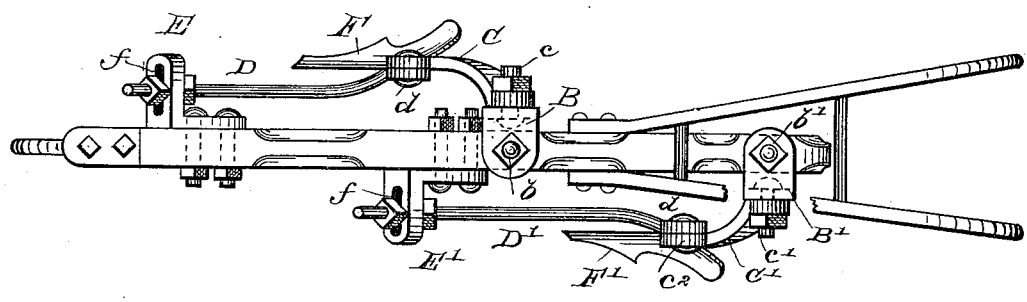

Figure 1 is a side elevation of a cultivator embodying the features of my improvement. Fig. 2 is a plan view of the same. Fig. 3 is a plan view showing the parts in different positions of adjustment to those shown in Fig. 2.

A is the draft-beam, provided with ordinary clevis and handles, as shown.

B B' are stirrup-plates set over the draft-beam from opposite sides of the same and secured thereto by bolts $b\ b'$, set through vertical perforations in the beam A and corresponding perforations in the stirrup-plates for securing the latter rigidly to the beam at various angles, for a purpose hereinafter explained. The stirrup-plates project laterally from the beam A sufficiently to receive bolts $c\ c'$ and clear the bolt-heads of the draft-beam, in order that the stirrup-plates may be adjusted at various angles to the beam without the bolt-heads interfering with such adjustment.

C C' are plow-stocks, having eyes at their upper ends for the reception of the bolts $c\ c'$, by means of which they are secured to the stirrup-plates. The stocks C C' are provided, in suitable positions, with eyes $c^2\ c^2$, by means of which and rivets or bolts $d\ d$ they are pivotally connected to rods D D', which are extended thence through angle-plates E E', rigidly secured to the beam A. The openings in the angle-plates are oblong, as shown at $f\ f$ in Fig. 2, in order that the rods D D' may be adjusted laterally toward or from the draft-beam A, for a purpose hereinafter set forth.

The stocks C C' may be constructed in a manner to be provided with plowshares, as shown at F F', or they may be constructed in a manner to be provided with shovels; or the stocks may be adapted to the attachment of either or of different kinds of blades; or a series of stocks C C' provided with different kinds of shares, shovels, or scrapers may be applied as occasion may require.

By reason of the adjustable connection of the stocks C C' with the stirrup-plates B B' they may be adjusted at a more or less acute angle to the draft-beam, and may be rigidly secured in any desired angular relation to the same by means of the rods D D', extended thence through the plates E E' and the nuts at each side thereof, as shown, and the shares or shovels thereby adapted to cut and run at different depths exactly adapted to the cultivation of different kinds of plants in different soils.

By reason of the adjustable connection of the stirrup-plates B B' with the beam A and the adjustable connection of the rods D D' with the plates E E' the stocks C C' may be adjusted to and rigidly held at either an outward or inward inclination to the beam A, and the shares, shovels, or scrapers, with which the stocks C C' may be supplied, thereby caused to move the soil from the middle of the plant-rows toward the plants at each side of the same, or, when the implement is used as a straddle-row cultivator, to move the soil from the middle of the plant-rows toward the plants from each side of the same, as occasion may require.

Having explained the features of my improvement, what I claim as new, and desire to secure by Letters Patent, is—

1. The combination of the draft-beam, the slotted angle-plates, the stirrup-plates pivoted to the beam, the stocks secured to the stirrup-plates, as specified, and the brace-rods pivoted to the stocks and adapted to secure the different adjustments of the latter, as and for the purpose set forth.

2. The combination, with the plow-stocks and stirrup-plates adjustably secured to each other and to the draft-beam, of the slotted angle-plates fixed to the draft-beam, and the brace-rods pivoted to the plow-stocks and secured to the slotted angle-plates, substantially as and for the purpose set forth.

In testimony whereof I affix my signature in presence of two witnesses.

LAWSON X FOSTER.
his mark.

Witnesses:
A. R. BALLENGER,
PEYTON BALLENGER.